United States Patent [19]
Bourges

[11] 3,934,616
[45] Jan. 27, 1976

[54] TELESCOPIC STRUCTURE

[75] Inventor: Bernard M. Bourges, Le Plessis Belleville, France

[73] Assignee: Societe Anonyme: Poclain, Le Plessis Belleville, France

[22] Filed: Feb. 27, 1974

[21] Appl. No.: 446,232

[52] U.S. Cl. ............... 138/113; 138/114; 138/178; 312/301; 312/330 R
[51] Int. Cl.² ........................ F16L 7/00; F16L 9/20
[58] Field of Search ...... 52/114, 115, 118; 138/118, 138/120, 111–114, 178; 312/301, 304, 330 R, 349, 350; 212/55; 285/24, 25, 28, 31

[56] References Cited
UNITED STATES PATENTS

| | | | |
|---|---|---|---|
| 2,535,707 | 12/1950 | Vezey | 312/330 X |
| 2,614,017 | 10/1952 | Mugnier | 312/301 X |
| 3,416,850 | 12/1968 | Hilfinger et al. | 312/330 |
| 3,490,823 | 1/1970 | Neu et al. | 312/330 |
| 3,744,869 | 7/1973 | Anderson et al. | 312/330 |

*Primary Examiner*—Richard E. Aegerter
*Assistant Examiner*—James E. Bryant, III
*Attorney, Agent, or Firm*—Fitzpatrick, Cella, Harper & Scinto

[57] ABSTRACT

A telescopic structure comprises an inner and an outer member telescopic relative to each other, and means for supporting and/or guiding one member relative to the other member, comprising a pair of wheels mounted on each member and positioned between the members, the wheels on one member bearing on parallel runways fixed to the other member, the runways each having an at least partly circular section with the peripheral surfaces of the wheels bearing on the runways being correspondingly toroidally shaped to have geometric projections in a plane perpendicular to the direction of extent of the runways extending parallel and perpendicular to the rotational axes of the wheels.

2 Claims, 4 Drawing Figures

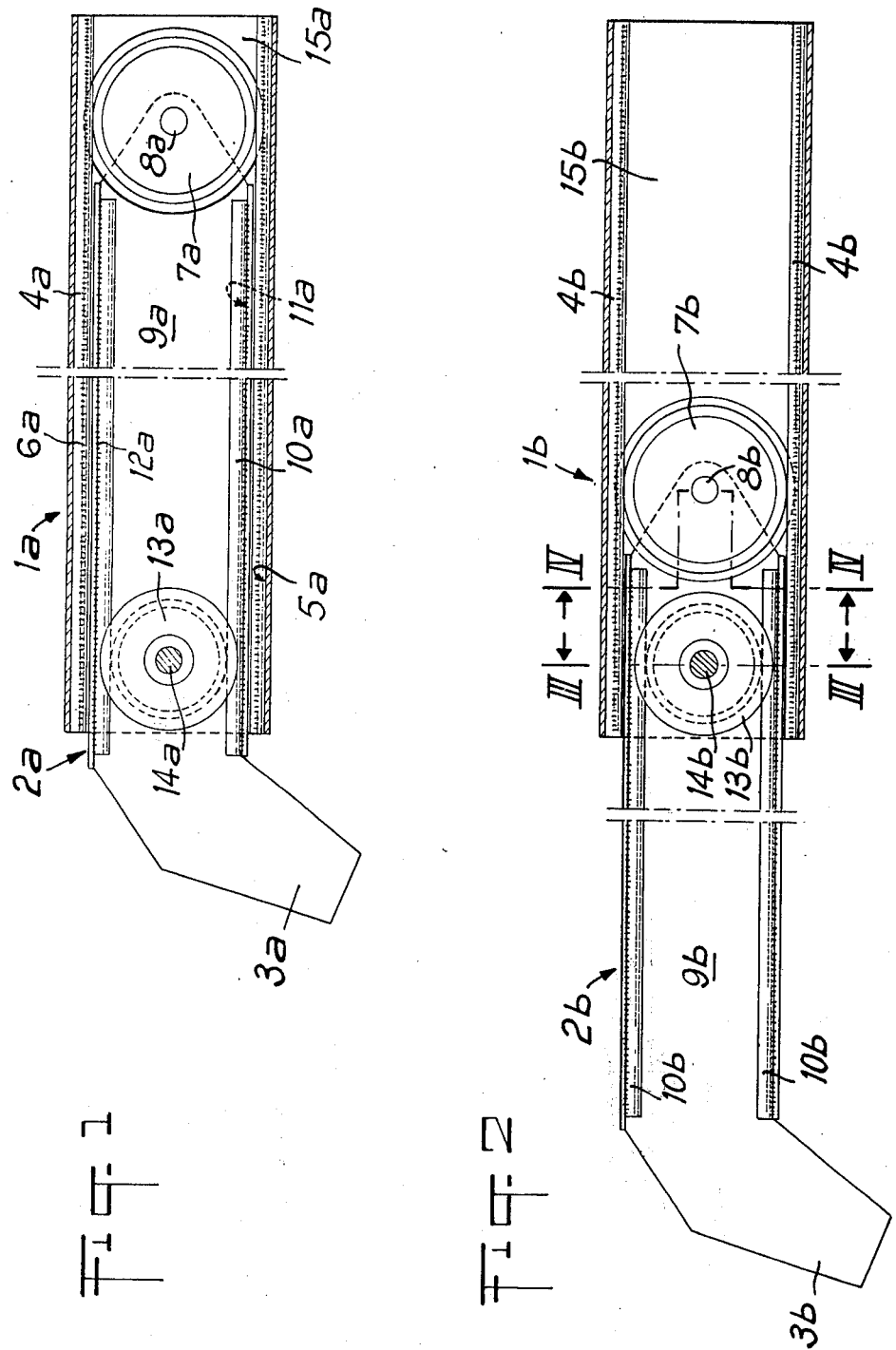

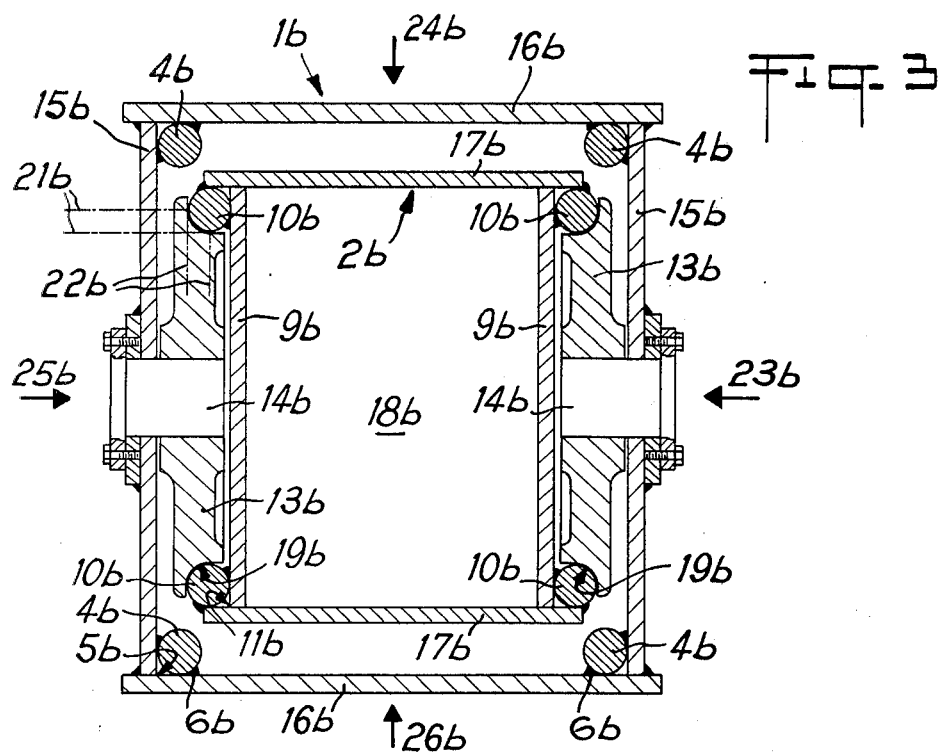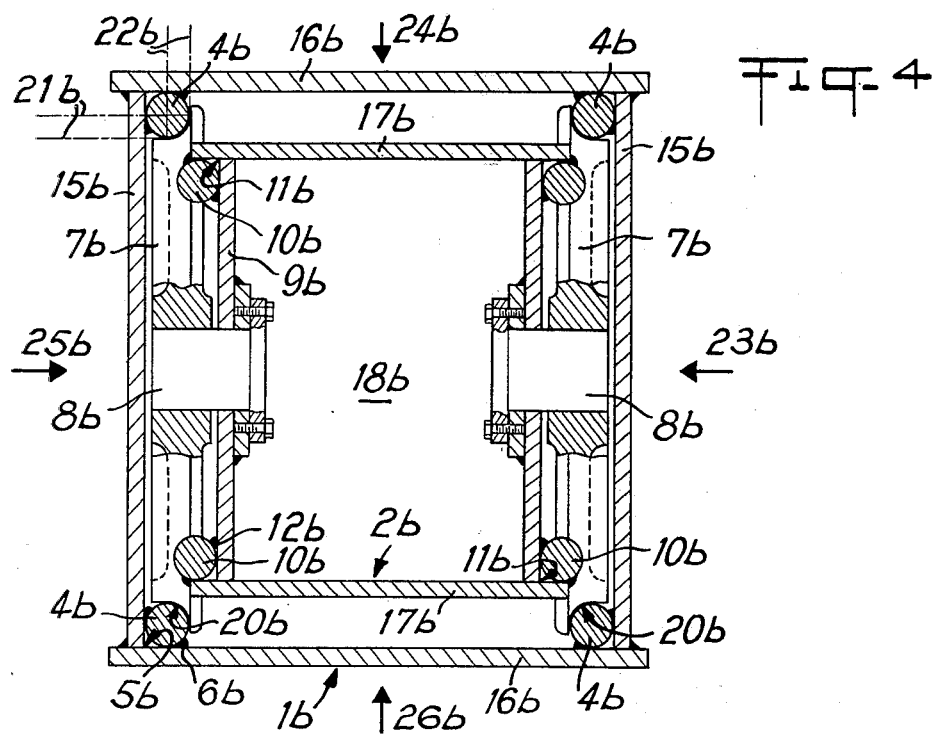

TELESCOPIC STRUCTURE

The present invention concerns improvements in telescopic structures.

Telescopic structures have numerous applications, for example in the manufacture of telescopic jibs for cranes. This application will be taken as an explanatory example which is, of course, not limiting.

The telescoping of one member relative to another member necessitates the use of special guide and support means, which at the present time are arranged adjacent the point of exit of the inner member from the outer member and adjacent the inner end of the inner member. In practice, these means must enable stresses to be taken up in four perpendicular directions perpendicular to the telescopic axis.

Each set of guide and support means at present comprises four rollers rotatably mounted on one of the members and bearing against the other member. Moreover, they are of such a size that they require the formation of ports in the wall of the member on which they are mounted, causing at that part a weakening of the wall. The large number of rollers (eight in the case mentioned) necessary also increases the internal obstructions in the members which makes it difficult to find satisfactory solutions in the designing of telescopic jibs. The rollers also contribute to the dead weight of the structure and, consequently, reduce the lifting characteristics of the jib, all other things being equal.

According to the invention there is provided a telescopic structure comprising:

at least an inner and an outer member which are telescopic one relative to the other; and means for guiding and/or supporting one of said members relative to the other of said members in four mutually perpendicular directions, said guiding and/or supporting means comprising:

two pairs of wheels arranged between said inner and outer members, means for coupling each of said pairs of wheels to a respective one of said inner and outer members, means for mounting at least one of said pairs of wheels for rotation about substantially parallel axes, a pair of parallel runways in respect of each of said wheels, situated one on each side of the rotational axis of the respective wheel and on which the peripheral surface of the respective wheel bears, means rigidly attaching each pair of parallel runways to that one of said inner and outer members with which the respective wheel is not coupled, at least two of said pairs of runways being rigidly attached along the external corners of said inner member, and wherein one of said runways has a cross-section which is at least partly circular and said peripheral surface of the respective wheel bearing thereon is shaped to be at least partly toroidal with a diameter substantially equal to the diameter of the circular part of said runway.

Advantageously, two pairs of runways are fixed along the inside corners of the outer member, the corresponding wheels being wheels of relatively large diameter.

Preferably, the diameters of the wheels of one pair of wheels are larger than the diameters of the other wheels.

In this embodiment, it is advantageous for the larger wheels to move with the inner member and to be attached adjacent the inner end of the inner member, and the smaller wheels to move with the outer member and to be attached adjacent that end of the outer member through which the inner member moves.

Preferably, the axes of rotation of all the wheels are substantially parallel.

A better understanding of the invention will be obtained, and secondary features and their advantages will become apparent, from the following description of an embodiment thereof, given by way of example only, with reference to the accompanying drawings, in which:

FIG. 1 is an axial section through a telescopic jib in accordance with the invention, the inner member being retracted into the outer member;

FIG. 2 is an axial section through the telescopic jib of FIG. 1, but showing the jib in its extended configuration, and FIGS. 3 and 4 are sections along the lines III—III and IV—IV, respectively, of FIG. 2.

The jib shown in FIG. 1 comprises two members, an outer member 1a inside which is arranged an inner member 2a. The relative telescopic positions of the two members are controlled by means which are not shown but which are conventional. By way of example, this means may be an hydraulic ram. The member 2a can be completely retracted into the member 1a, except of course for its outer end 3a, which usually carries a handling block.

It will be noted that runways in the form of sections 4a, as shown of circular cross-section, are arranged along the inside corners 5a of the member 1a, and they are fixed to these corners by weld beads 6a. A wheel 7a is mounted for rotation about a shaft 8a rigidly attached to one of the walls 9a of the member 2a and arranged at the inner end of the member 2a.

In a similar manner, runways in the form of sections 10a, also as shown of circular cross-section, are arranged along the outside corners 11a of the member 2a and are fixed to these corners by weld beads 12a. A wheel 13a is mounted for rotation about a shaft 14a, rigidly attached to one of the walls 15a of the member 1a and arranged at that end of the member 1a, through which the member 2a leaves the member 1a.

FIG. 2 shows the above-described jib, but in a second configuration. In FIG. 2 the various elements already described above are indicated by the same reference numbers, but followed by the letter b. The member 2b is completely extended relative to the member 1b, and it will be noted that the wheel 7b mounted on the member 2b has come to a position adjacent the wheel 13b which is mounted on member 1b.

With reference to FIGS. 3 and 4, it will be noted that there are two wheels 13b arranged one on each side of the member 2b, each between a vertical wall 15b of the member 1b and a vertical wall 9b of the member 2b. In the same way, there are two wheels 7b which are arranged one on each side of the said member 2b, each between a wall 15b and a wall 9b. It will be noted that the members 1b and 2b each consist of a box-girder with a rectangular cross-section, walls 16b and 17b connecting walls 15b and 9b respectively. It will be seen that the axes of the shafts 8b and 14b are mutually parallel and perpendicular to the walls 9b and 15b. Further, the interior 18b of the member 2b is entirely clear of obstruction since the wheels are arranged outside this member 2b.

The peripheral surfaces 19b and 20b of the tyres of the wheels 13b and 7b have toroidal shapes corresponding to those of the sections 10b and 4b opposite which they are arranged. The diameter of the generating circle of the torus is therefore substantially equal to that of the corresponding section, the sections being arranged in pairs one on each side of the shafts 8b and 14b.

Lastly, it will be noted that the projections of the surfaces 19b and 20b of each wheel tyre on to each section 10b and 4b, perpendicular to the axes of the said sections and parallel and perpendicular to the axes of the shafts 14b and 8b, (i.e., between lines 21b and 22b respectively), effectively ride the corresponding section when the tyre is bearing against the section. It will also be noted that the wheels 7b have a greater mean diameter than wheels 13b. For this reason, the wheels 7b are called large wheels, the wheels 13b are called small wheels.

The advantages inherent in the above described structure will be set forth below.

Firstly, it will be noted that guiding and support of the member 2b in the member 1b are effected in a satisfactory manner. The possible stresses may be resolved into four main directions 23b, 24b, 25b and 26b perpendicular to each wall 7b, 16b and directed towards the corresponding wall and may be applied, for example, to the outer end of member 2b.

A stress in the direction 23b (or 25b) is balanced by the reaction of application of one of the wheels 13b to the two corresponding sections 10b, particularly by application of the projection of the tyre of the wheel 13b to these sections parallel to the lines 21b and by the reaction of application of the wheel 7b, situated on the side of the member 2b opposite to the one on which the above-mentioned wheel 13b is situated, to the two corresponding sections 4b, particularly by application of the projection of the tyre of this wheel 7b to these sections parallel to the lines 21b.

In the same way, a stress in the direction 24b (or 26b) is balanced by the reaction of application of the two wheels 13b to the two sections 10b arranged on the same side of the axis of the shafts 14b, particularly by application of the projections of the tyres of the said wheels 13b to these sections parallel to the lines 22b, and by the reaction of application of the two wheels 7b to the two sections 4b arranged on the side of the axis of the shafts 14b opposite that of the sections 10b, particularly by application of the projections of the tyres of the said wheels 7b to these sections 4b parallel to the lines 22b.

consequently, all stresses are taken up correctly, even during telescoping, for they are taken up on the rotary wheels bearing on sections which are intended for this purpose.

The total bulk is relatively small. In particular, there are only four wheels instead of the eight rollers of the known arrangement. The total dead weight of the jib is therefore reduced and, consequently, performances (particularly the working load which can be lifted) are increased.

Moreover, the wheels 7b and 13b of a member do not require the formation of ports to enable them to bear against the other member, as they are arranged in the space between the two members. This results in the absence of weakened zones in the walls of the members.

Furthermore, the sections 4b and 10b add to the mechanical strength, in particular the resistance to bending, of the members 1b and 2b. Consequently, the walls 15b and 16b and 9b and 17b may be thinner and therefore lighter than those of known arrangements. A further increase in performance results from this reduction.

In addition, the stresses are transmitted through the shafts 8b and 14b carried on the corresponding walls 9b and 15b, and not by interposition of pivoting devices as in the case of rollers. There is therefore good stress transmission, these stresses also acting on or adjacent the neutral line of the beam formed by each member 1b, 2b.

What is claimed is:

1. A telescopic structure comprising:
   at least an inner and an outer member which are telescopic one relative to the other; and
   means for guiding and/or supporting one of said members relative to the other of said members in four mutually perpendicular directions, said guiding and/or supporting means comprising:
   two pairs of wheels arranged between said inner and outer members,
   means for coupling each of said pairs of wheels to a respective one of said inner and outer members,
   means for mounting at least one of said pairs of wheels for rotation about substantially parallel axes,
   a pair of parallel runways in respect of each of said wheels, situated one on each side of the rotational axis of the respective wheel and on which the peripheral surface of the respective wheel bears,
   means rigidly attaching each pair of parallel runways to that one of said inner and outer members with which the respective wheel is not coupled, at least two of said pairs of runways being rigidly attached along the external corners of said inner member, and the other two of said pairs of runways being rigidly attached to the internal corners of said outer member,
   and wherein one of said runways has a cross-section which is at least partly circular and said peripheral surface of the respective wheel bearing thereon is shaped to be at least partly toroidal with a diameter substantially equal to the diameter of the circular part of said runway and the diameters of the wheels bearing thereon being larger than the diameters of the other wheels.

2. A structure in accordance with claim 1, wherein said smaller wheels are coupled to said outer member and are attached thereto adjacent that end of said outer member through which said inner member moves, and said larger wheels are coupled to move with said inner section and are attached thereto adjacent the inner end of said inner section.

* * * * *

UNITED STATES PATENT OFFICE
CERTIFICATE OF CORRECTION

Patent No. 3,934,616          Dated January 27, 1976

Inventor(s) BERNARD M. BOURGES

It is certified that error appears in the above-identified patent and that said Letters Patent are hereby corrected as shown below:

First page, bibliographic data, beneath "[21]" and above "[52]" insert

-- [30]      Foreign Application Priority Data

April 4, 1973 France ............ 73.12183 --

Column 3, line 54, change "consequently" to -- Consequently --.
Column 4, lines 62 and 63, change "section" to -- member --.

Signed and Sealed this

Sixth Day of July 1976

[SEAL]

Attest:

RUTH C. MASON
*Attesting Officer*

C. MARSHALL DANN
*Commissioner of Patents and Trademarks*